United States Patent [19]

White

[11] Patent Number: 4,835,454
[45] Date of Patent: May 30, 1989

[54] ADVANCED FEED FORWARD SWITCH MODE POWER SUPPPLY CONTROL

[75] Inventor: Robert C. White, La Mesa, Calif.

[73] Assignee: Sundstrand Corp., Rockford, Ill.

[21] Appl. No.: 133,343

[22] Filed: Dec. 15, 1987

[51] Int. Cl.[4] .......................................... H02M 3/156
[52] U.S. Cl. .................................... 323/222; 363/25; 363/26
[58] Field of Search ............... 323/222, 285, 288, 299; 363/21, 25, 26

[56] References Cited

U.S. PATENT DOCUMENTS

| | | | |
|---|---|---|---|
| 4,301,497 | 11/1981 | Johari | 363/21 |
| 4,371,917 | 2/1983 | Bator | 363/21 |
| 4,484,256 | 11/1984 | Hartman | 363/26 |
| 4,536,700 | 8/1985 | Bello et al. | 323/222 |
| 4,580,089 | 4/1986 | Grünsch et al. | 323/287 |
| 4,594,649 | 6/1986 | Rhoads et al. | 363/56 |
| 4,618,812 | 10/1986 | Kawakami | 323/224 |

FOREIGN PATENT DOCUMENTS 3340395  5/1984  Fed. Rep. of Germany .
3533613  4/1986  Fed. Rep. of Germany ........ 363/21
25166    2/1982  Japan .................................... 363/26

OTHER PUBLICATIONS

Calvo et al., "Circuit to Linearize the Control Loop of a Switching Voltage Regulator", IBM Tech. Discl. Bul., vol. 22, No. 6, pp. 2191-2192, Nov. 79.
IBM Technical Disclosure Bulletin, vol. 27, No. 1A, Jun. 1984, pp. 109-114.

Primary Examiner—William H. Beha, Jr.
Attorney, Agent, or Firm—Antonelli, Terry & Wands

[57] ABSTRACT

An improved DC to DC conveter is disclosed which is highly stable and has a highly regulated ouptut voltage. A pulse width modulator drives a switch for interrupting the flow of current through an inductor. A combination of feed forward and feedback control of the pulse width modulator is provided with the majority of control being provided by the feed forward component. The pulse width of the pulses from the width modulator is directly proportional to the feed forward and feedback components of the pulse duration control signal. Preferably, approximately 75%-90% of the pulse duration control signal is provided by the feed forward component.

13 Claims, 4 Drawing Sheets

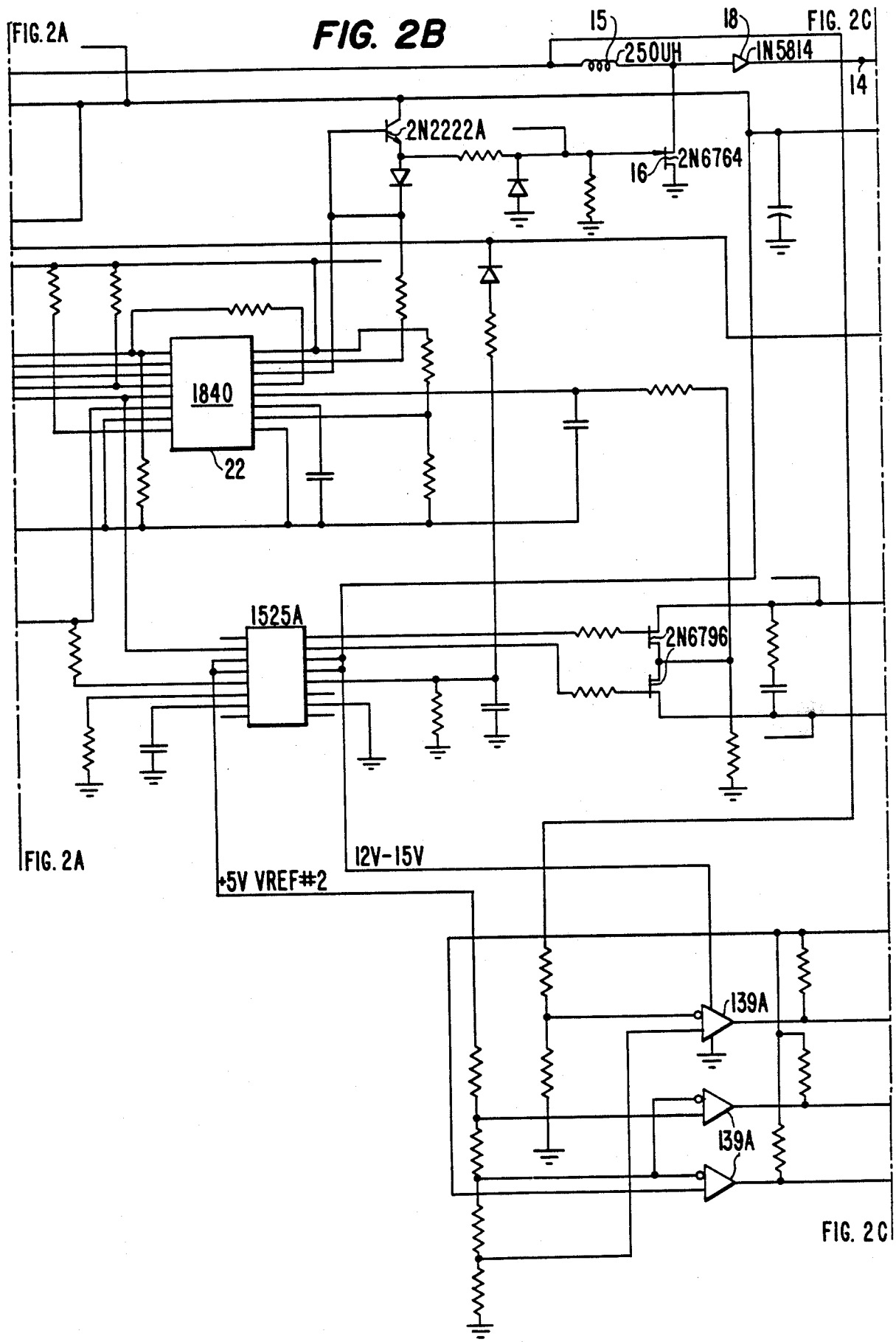

ADVANCED FEED FORWARD SWITCH MODE POWER SUPPPLY CONTROL

BACKGROUND OF THE INVENTION

1. Field of the Invention

The present invention relates to DC to DC converters for converting a DC input potential to a DC output potential. More particularly, the present invention relates to DC to DC converters which produce a highly regulated output potential from an input potential which has substantial variations.

2. Description of the Prior Art

Many forms of DC to DC converters are known for converting a DC input power to a DC output power. One well known type of DC to DC converter utilizes an electronically controlled switch connected in series with an inductance with the on time of the switch being modulated by a pulse width modulator. The output potential is proportional to the duration of the pulses applied to the control terminal of the switch by the pulse width modulator.

When this type of DC to DC converter obtains its input power from a battery which is also used for electrically starting engines, such as a gas turbine powered auxiliary power unit, the normal 24 volt battery potential can drop as low as 8 volts, when starting current for an electric starter for an electric starter is being drawn. It is desirable to have a DC to DC converter which produces an output which is not greatly influenced by the input voltage transients of this type.

In a DC to DC converter, the pulse width modulator has commonly been continually controlled exclusively by a feedback signal derived from the output potential. In these converters, the width of the pulses outputted by the pulse width modulator is directly controlled by the feedback signal. Feedback systems typically have circuitry to prevent loop lockup which occurs when the duty cycle of the pulses outputted by the pulse width modulator goes to 100% preventing normal operation and requiring shut down of the converter to return control to the pulse width modulator.

The assignee of the present invention has offered for sale a DC to DC converter more than one year ago which generates the control signal for continually modulating the width of the pulses from the pulse width modulator totally from feed forward of the input potential. In order to insure a high degree of regulation with respect to supplied power, it was necessary to utilize slope and intercept potentiometers to maximize regulation under conditions in which both the input potential and the load applied to the output varied. This power supply exhibited acceptable regulation but was subject to tedious adjustment of the aforementioned potentiometers. Moreover, the potentiometers added expense to the overall cost of the power supply.

DC to DC converters are also known which have a pulse width modulator controlled by control signal which has a majority of control derived from feedback and a minority of control derived from the derivative of the input potential.

Exemplary of DC to DC converters using feedback as the total control mechanism of the pulse width modulator are U.S. Pat. Nos. 4,371,917 and 4,580,089, and West German Patent DE No. 3,340,395.

U.S. Pat. No. 4,618,812 discloses a pulse width modulator having a pulse width modulator controlled by a signal derived from the input potential and signal fed back from the output. The duty cycle of the pulse width modulator is not directly controlled by the input potential. The feed forward signal controls the conduction of transistors which gate the output of the pulse width modulator.

IBM Technical Disclosure Bulletin, Vol. 27, No. 1A, June 1984, pp. 109–114, discloses a DC to DC converter having a pulse width modulator which is controlled totally from sensing of the magnitude of the input signal.

SUMMARY OF THE INVENTION

The present invention provides an improved DC to DC converter which produces a stable output voltage which is unperturbed by variations in the input voltage or variations in the output load. The aforementioned characteristic permits a highly regulated output potential to be developed without the necessity of slope and intercept potentiometers as utilized in the assignee's prior art power supplies using only a feed forward control signal to vary the duty cycle of the pulse width modulator. With the invention, no calibrations are required to produce satisfactory operation under the aforementioned conditions of variable input potential and variable loads in the output.

The aforementioned operational characteristics are achieved by the continuous control of the pulse width produced by a pulse width modulator by a pulse duration control signal which is derived from sensing of the input voltage as a feed forward signal and sensing of the output signal as a feedback signal with the majority of the amplitude of the pulse duration control signal being derived from the feeding forward of the input potential. Preferably, between 75%–90% of the magnitude of the pulse duration control signal is derived from the feeding forward of the input voltage. The percentage of the total pulse duration control signal which is derived from feedback is chosen to be sufficient to compensate for variations in the circuit and components. Limiting feedback to this amount permits elimination of conventional circuits used in DC to DC converters based exclusively on feedback to prevent loop lockup and control instability.

A DC to DC converter for converting a DC input potential to a DC output potential in accordance with the invention includes a pair of input terminals which are adapted to be coupled to a source of the input potential; a pair of output terminals which are adapted to be connected to an electrical load to be driven by the output DC potential; a circuit disposed between the pair of input terminals for conducting current between the input terminals through an inductance contained therein; a switch, having a control terminal for controlling conduction of current between a pair of terminals with at least on of the pair of terminals being coupled to the circuit for conducting current between the input terminals for varying the current flowing in the inductance as a function of the conduction of the switch; pulse width modulator for producing series of pulses having a frequency and a variable duration in response to pulse duration control signal, the pulses being coupled to the control terminal of the switch for controlling conduction of the switch in direct proportion to the variable duration of the pulses; a feed forward circuit, coupled to the input terminals, for producing a first control signal which has a magnitude proportional to the sensed input potential; a feedback circuit coupled to the output terminals, for producing a second control signal which has a magnitude proportional to the sensed DC output potential and a third control signal which has a magnitude proportional to an integral of the DC output potential and a sum of the first second and third control signals is applied to the pulse width modulator as the pulse duration control signal and the duration of the pulses is directly proportional , magnitude of the pulse duration control signal. A majority of pulse duration control provided by the pulse duration control signal is provided by the first control signal.

Furthermore, an integrator coupled to the output terminals, produces the third signal which has a magnitude proportional to an integral of the DC output potential.

An inductor is connected in series between the input terminal and the switch which is coupled to ground. A diode is coupled between the inductor and one of the output terminals. A signal is fed back from the cathode of the diode to an input of a proportional amplifier to generate the second control signal and to the input of an integrator to generate the third control signal. The input voltage is fed forward to an input of a proportional amplifier to generate the first control signal. The first, second and third control signals are summed and the resulting output is applied to the pulse width modulator as the pulse duration control signal.

BRIEF DESCRIPTION OF THE DRAWINGS

FIGS. 2A-2C collectively are a circuit schematic of a preferred embodiment of the present invention.

DESCRIPTION OF THE PREFERRED EMBODIMENT

The present invention is an improved DC to DC converter having a regulated output voltage which has minimized susceptibility to variations in input potential or variations in electrical load applied to the output. The output potential is a function of a pulse width modulation signal applied to switching circuit which interrupts the flow of electrical current in an inductor. The pulse width modulation signal is produced by the mixing of feed forward signal, which is a function of the input voltage, and a feedback signal, which, is a function of the output signal, with the majority of the amplitude of the pulse width modulation control signal being derived from the feed forward component. Preferably, 75%-90% of the pulse width modulation control signal is derived from the feed forward component with the percentage of the pulse width modulation signal derived from feedback being only sufficient to compensate for circuit and component variation. No calibration is required to operate the power supply.

Figure 1:
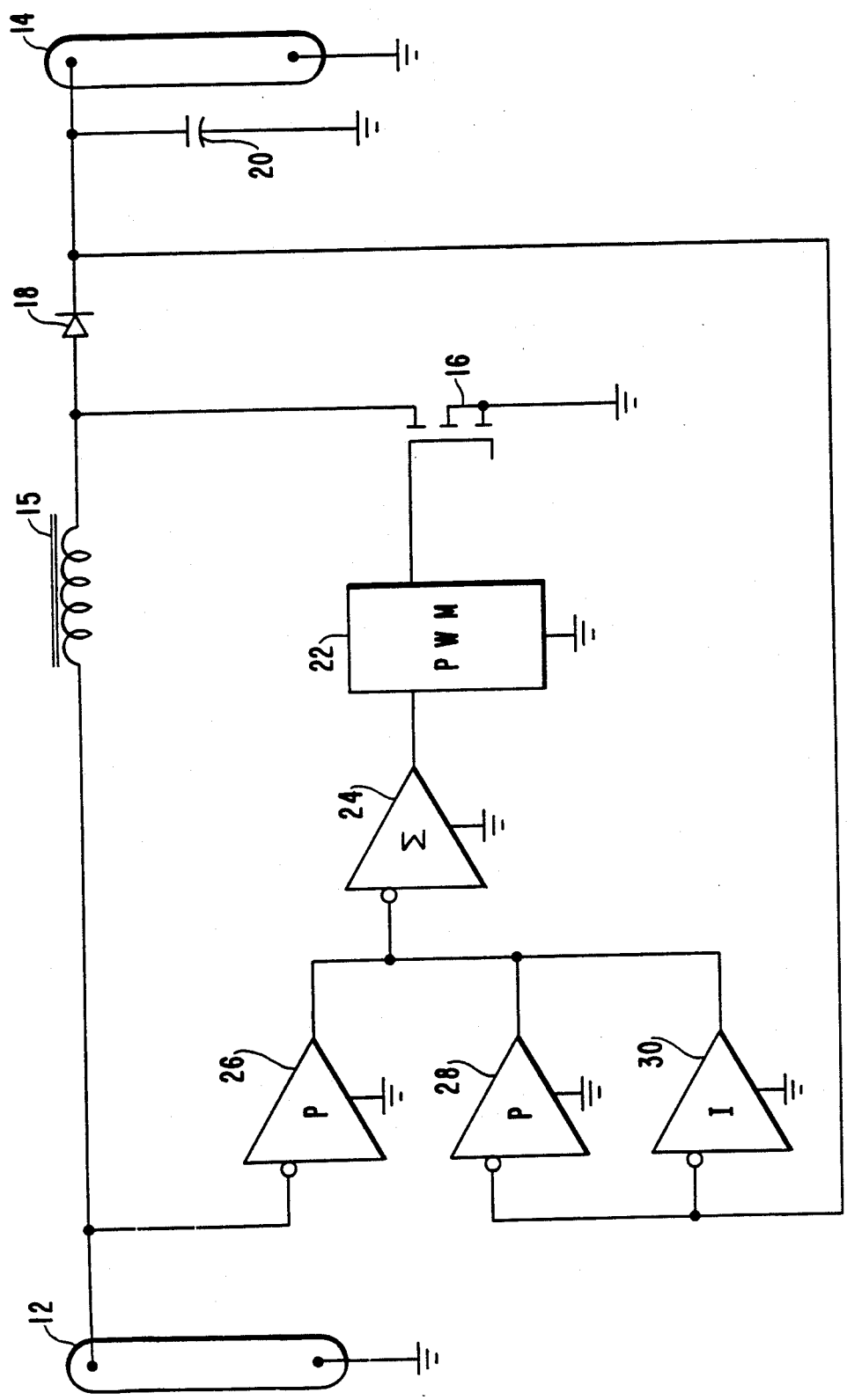
FIG. 1 a block diagram of a DC to DC converter in accordance with the present invention.

FIG. 1 illustrates a block diagram of a DC to DC converter in accordance with the present invention. A pair of input terminals 12 are provided for connection to a source of input potential which may be obtained from a 24 volt battery subject to reduction in magnitude from 24 to 8 volts during connection to an electric starter for a gas turbine powered auxiliary power unit. A pair of output terminals 14 are provided for connection of the regulated output potential to an electrical load not illustrated. A series circuit is coupled between the input terminals 12 having an inductor 15, and a switch 16 which may be a field effect transistor or other known switching device. A diode 18 is connected between the inductor 14 and one of the output terminals 14. A storage capacitor 20 is connected between the output terminals 14 for storing the regulated output potential. A pulse width modulator 22 produces an output series of pulses of variable duration for controlling the conduction of the switch 16. The duration of the output pulses from the pulse width modulator 22 is directly proportional to the pulse duration control signal applied by summer 24.

A feed forward circuit produces a first control signal which has a magnitude proportional to the sensed input potential at the terminals 12. The feed forward circuit is a proportional amplifier 26 which preferably is implemented as an operational amplifier which produces an output signal directly proportional to the magnitude of the input signal sensed from the input terminals 12. The feed forward circuit applies at least the majority of the amplitude of the pulse duration control signal and, preferably, between 75%-90% of the total magnitude of the pulse duration control signal.

A feedback circuit provides feedback control for the pulse width modulator 22. The potential at the cathode of diode 18 is fed back to a proportional amplifier 28 which may be an operational amplifier outputting a second control signal proportional to the magnitude of the voltage at the cathode of the diode. Furthermore, an integrator 30 integrates the voltage sensed at the cathode of the diode 18 to produce a third control signal. The feedback signal produced by the integrator 30 at steady state ranges from 10%-25% of the pulse duration control signal. The integrator 30 provides an input to the summer 24 which brings the error to zero. The output signals from the operational amplifiers 26 and 28 and the output signal from the integrator 30 are summed by summer 24 to produce the aforementioned pulse duration control signal.

A DC to DC converter in accordance with the present invention provides a highly stable and a highly regulated output voltage which does not vary appreciably with the variation in the input voltage or a variation in the output load. The magnitude of the feedback signal as a component of the overall pulse duration control signal is only sufficient to correct for variation in circuit and component values of the circuit elements used to implement the present invention and further eliminates the requirement for slope and intercept potentiometers which in the prior art using feed forward have been necessary to maximize stability of the output voltage in the face of varying input potential.

Figure 2A:
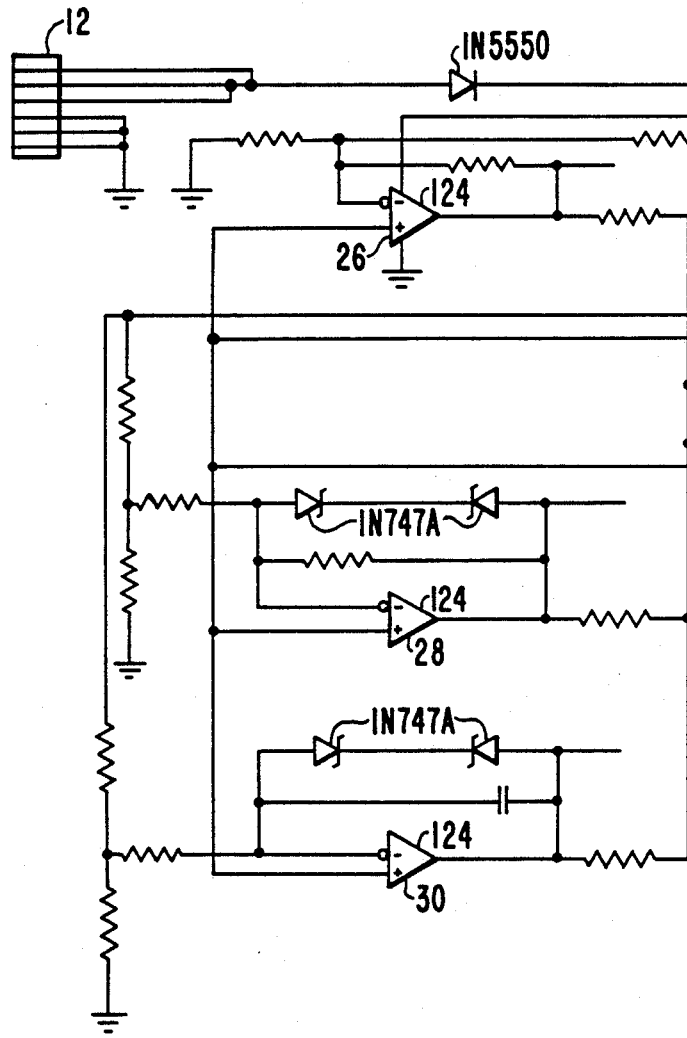
Figure 2A:
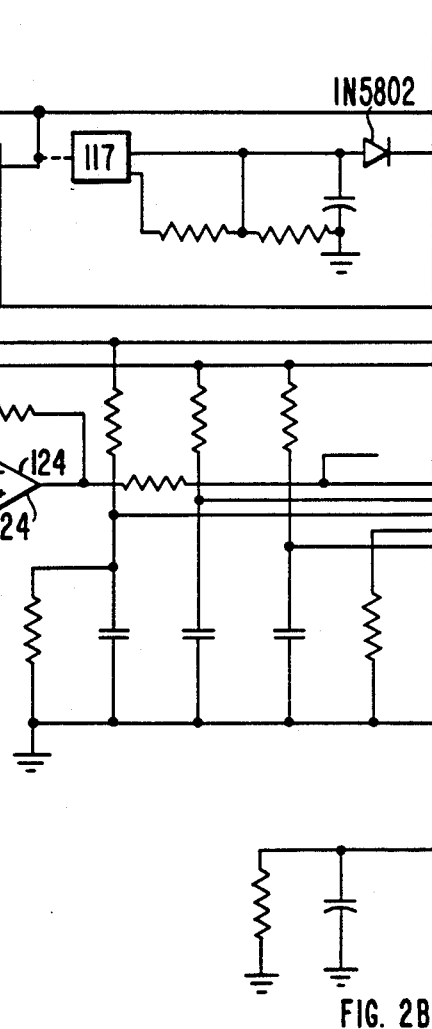
Figure 2C:
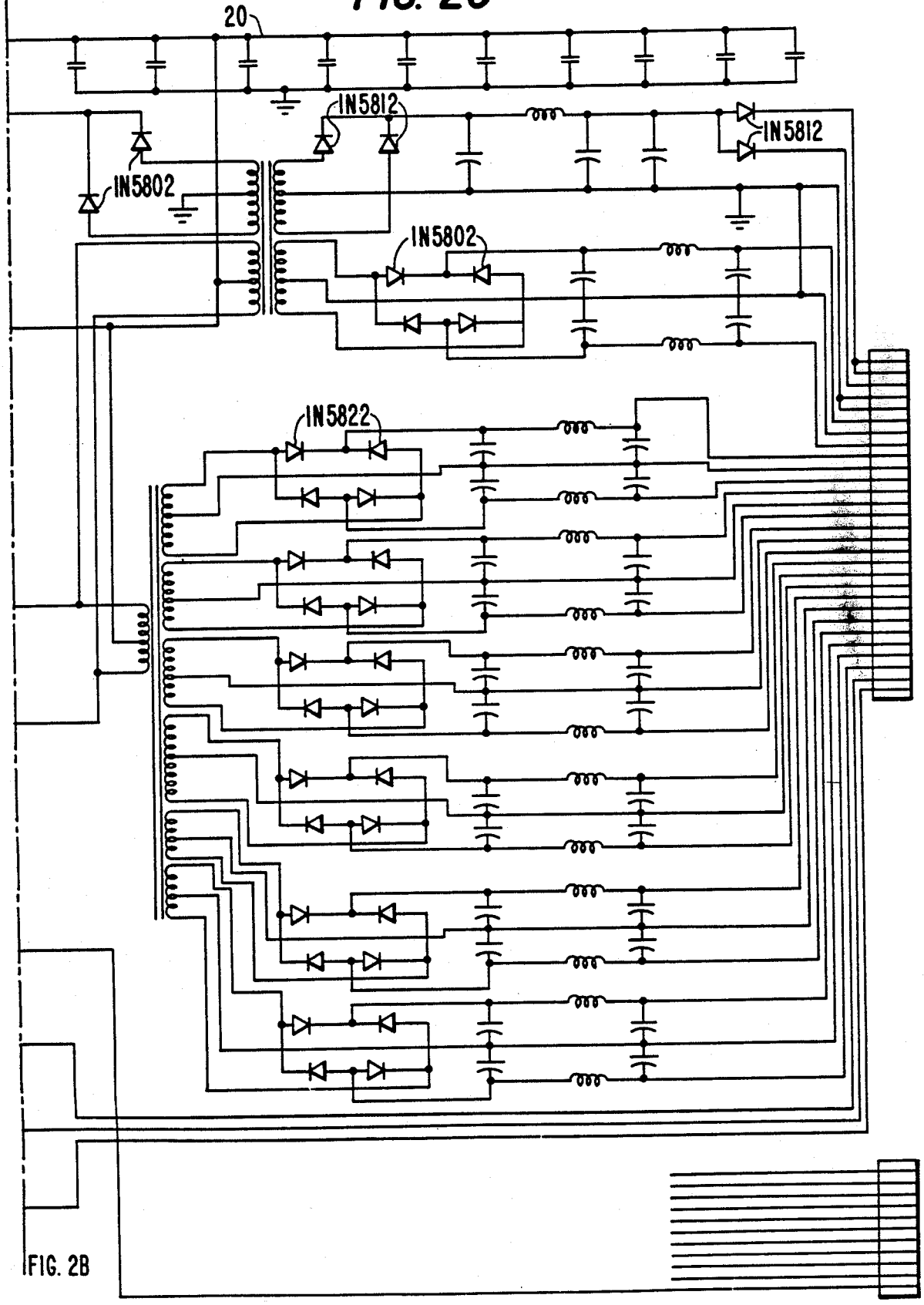

FIGS. 2A-2C illustrate a circuit schematic of a preferred embodiment of the present invention. Commercially available circuit elements are identified by their commercial designations. The corresponding circuitry for implementing the elements of the block diagram of FIG. 1 is identified by blocks defined by dotted lines which are labelled with the same reference numerals used in FIG. 1.

While the invention has been described in terms of its preferred embodiment, numerous modifications may be made thereto without departure from the spirit and scope of the invention. It is intended that all such modifications fall within the scope of the appended claims.

I claim:

1. A DC to DC converter for converting a D input potential to a DC output potential comprising:
   (a) a pair of input terminals which are adapted to be coupled to a source of the input potential;

(b) a pair of output terminals which are adapted to be connected to an electrical load to be driven by the output DC potential;

(c) means, disposed between the pair of input terminals, for conducting current between the input terminals through an inductance contained therein;

(d) switching means having a control terminal for controlling conduction of current between a pair of terminals, at least one of the pair of terminals being coupled to the means for conducting current between the input terminals, for varying the current flowing in the inductance as a function of the conduction of the switching means;

(e) pulse width modulation means for producing a series of pulses having a frequency and a variable duration in response to a pulse duration signal, the pulses being coupled to the control terminal of the switching means for controlling conduction of the switching means in direct proportion to the frequency and variable duration of the pulses;

(f) means, coupled to the input terminals, for generating a first control signal which has a magnitude proportional to the DC output potential;

(g) means, coupled to the output terminals for generating a second control signal which has a magnitude proportional to the DC output potential;

(h) summing means, responsive to the first and second control signals, for generating the pulse duration control signal; and (i) means, coupled to the output terminals, for generating a third control signal which has a magnitude proportional to an integral of the DC output potential, the third control signal being added to the first and second control signals to form the pulse duration control signal.

2. A DC to DC converter in accordance with claim 1 wherein:
a majority of pulse duration control from the pulse duration control signal is provided by the first control signal.

3. A DC to DC converter in accordance with claim 2 wherein the first control signal provides between 75 and 90% the amplitude of the pulse duration control provided by the pulse duration control signal.

4. A DC to DC converter in accordance with claim 2 wherein the amplitude of the second control signal ranges from 10% to 25% of the amplitude of the pulse duration control signal at steady state.

5. A DC to DC converter in accordance with claim 2 wherein the means for conducting comprises:
a series circuit with the inductance being an inductor with a pair of terminals, one of the pair of terminals being coupled to one of the input terminals, the other of the terminals of the inductor being coupled to one of the pair of terminals of the switching means and the other of the pair of terminals of being coupled to the other of the input terminals.

6. In a DC to DC converter for converting a DC input potential to a DC output potential in which conversion of the input potential to the output potential is produced by a pulse width modulation means which outputs a series of control pulses of a frequency and a variable duration as a control signal applied to a switching means, coupled to an inductance, for controlling conduction of current within the inductance in direct proportion to the frequency and duration of the control signal and the pulse width modulation means is controlled by a pulse width modulation control signal, the improvement comprising:

(a) means, for connection to the DC input potential, for generating a first control signal which has a magnitude proportional to the input potential;

(b) means, for connection to the output potential, for generating a second control signal which has a magnitude proportional to the DC output potential; and (c) means, for connection to the output potential, for generating a third control signal which has a magnitude proportional to an integral of the DC output potential; and (d) summing means, coupled to the means for generating the first control signal, the means for generating the second control signal, and the means for generating the third control signal for addition the first and second and third control signals together to generate the pulse width modulation control signal.

7. A DC to DC converter in accordance with claim 6 wherein:
a majority of pulse duration control is provided by the first control signal.

8. A DC to DC converter in accordance with claim 5 further comprising:
(a) a diode having a pair of terminals, one of the terminals of the diode being coupled to the other of the terminals of the inductor, the other of the terminals of the diode being coupled to one of the output terminals; and
(b) a storage capacitance having a pair of terminals, one of the respective terminals of the storage capacitance being coupled to one of the output terminals and the other of the output terminals of the capacitance being coupled to the other of the output terminals.

9. A DC to DC converter in accordance with claim 8 wherein:
the second and third control signals are respectively generated by feedback from the cathode of the diode to an input of a proportional amplifier and to an input of an integrator with outputs thereof being coupled to the pulse width modulation means.

10. A DC to DC converter in accordance with claim 6 wherein the first control signal provides between 75 to 90% of the pulse duration control provided by the pulse duration control signal.

11. A DC to DC converter in accordance with claim 10 wherein the magnitude of the second control signal ranges from 10 to 25% of the magnitude of the pulse width control signal at steady state.

12. A DC to Dc converter in accordance with claim 6 wherein:
(a) the means for generating the first control signal is a proportional amplifier; and
(b) the means for generating the second control signal is a proportional amplifier.

13. A DC to DC converter in accordance with claim 6 wherein:
(a) the means for generating the first control signal is a proportional amplifier;
(b) the means for generating the second control signal is a proportional amplifier; and
(c) the means for generating the third control signal is an integrator.

* * * * *